United States Patent [19]

Smith

[11] Patent Number: 4,523,114
[45] Date of Patent: Jun. 11, 1985

[54] MAGNETIC RECIPROCATING MOTOR

[76] Inventor: Raymond H. Smith, Rte. 2 - 5AAA, Larned, Kans. 67550

[21] Appl. No.: 587,820

[22] Filed: Mar. 9, 1984

Related U.S. Application Data

[63] Continuation of Ser. No. 523,337, Aug. 15, 1983, abandoned.

[51] Int. Cl.³ .............................................. H02K 33/00
[52] U.S. Cl. ........................................ 310/24; 310/34; 310/35
[58] Field of Search ............... 310/23, 24, 30, 34, 310/35

[56] References Cited

U.S. PATENT DOCUMENTS

| | | | |
|---|---|---|---|
| 2,338,005 | 1/1943 | Morch | 310/24 |
| 3,878,412 | 4/1975 | Kurpanek | 310/24 |
| 4,187,440 | 2/1980 | Ulmer | 310/24 |
| 4,317,058 | 2/1982 | Blalock | 310/24 |

Primary Examiner—Donovan F. Duggan
Attorney, Agent, or Firm—Litman, Day & McMahon

[57] ABSTRACT

A magnetic reciprocating motor including a block with a crankshaft journalled therein and a cylinder with inboard and outboard portions mounted thereon. A piston with a piston magnet is slidably disposed in the cylinder inboard portion. A carrier assembly reciprocates within the cylinder outboard portion and has a carrier magnet mounted thereon. A head magnet is mounted on a cylinder head attached to the cylinder outboard portion. An electrical distribution system is provided for selectively energizing at least one of the magnets to induce repulsion therebetween for reciprocating the piston and carrier assembly within the cylinder.

11 Claims, 4 Drawing Figures

ELECTRICAL DISTRIBUTION SYSTEM

MAGNETIC RECIPROCATING MOTOR

CROSS-REFERENCE TO RELATED APPLICATION

This application is a continuation of U.S. patent application Ser. No. 523,337, filed Aug. 15, 1983, now abandoned entitled DUAL MAGNETIC RECIPROCATING PISTON ENGINE by the applicant herein.

BACKGROUND OF THE INVENTION

1. Field of the Invention

The present invention relates to motors in general and in particular to a magnetic reiprocating motor.

2. Description of the Prior Art

Internal combustion reciprocating engines are well-known in the prior art and are widely utilized in motor vehicles, as well as in many other applications. However, most such engines are dependent on fossil fuels which are derived from dwindling resources. Electric motors are also well known and generally include an armature or rotor rotating about an axis under the influence of an electromagnetic field. The use of permanent magnets is well known in the field of electric motors.

The Blalock U.S. Pat. No. 4,317,058 teaches the conversion of a reciprocating internal combustion engine to a reciprocating electromagnetic engine. However, the Blalock engine suffers from many of the drawbacks of conventional internal combustion engines. The pistons of the Blalock engine alternately compress and expand the air trapped within their respective cylinders. Such expansion and retraction, while basic to the operation of an internal combustion reciprocating engine, actually resists free movement of the magnetic pistons under electromagnetic field forces.

Also, the heat gain associated with the compression of air within the cylinders in the Blalock engine tends to reduce the operating efficiency of the magnets. Furthermore, the power delivered by the Blalock pistons decreases exponentially throughout their respective power strokes due to the spacing between the pistons and the electromagnets.

Heretofore there has not been available a magnetic reciprocating motor with the advantages and features of the present invention.

SUMMARY OF THE INVENTION

In the practice of the present invention, a magnetic reciprocating motor is provided which includes an engine block having banks of cylinders arranged in a "V" configuration. Pistons with permanent magnets embedded therein are slidably disposed within each cylinder and are operably connected to a crankshaft journalled in the block. A two-part magnet carrier assembly is reciprocably disposed within each cylinder between a head thereof and the piston. The carrier includes a pair of electromagnets and a permanent magnet. Alternating opposing magnetic fields are created in multiple opposing pairs of magnets within each cylinder whereby each respective piston is alternately advanced and retracted. Air pressures generated by the reciprocating action of the cylinders and carriers are communicated between respective corresponding pairs of cylinders to assist in their reciprocating motions. A lubricating system is provided.

The principal objects of the present invention are: to provide a magnetic reciprocating motor; to provide such a motor which employs both permanent magnets and electromagnets; to provide such a motor which includes multiple cylinders; to provide such a motor wherein each cylinder includes a reciprocating piston and a reciprocating magnet carrier assembly; to provide such a motor wherein differential fluid pressures are communicated between corresponding cylinders to facilitate reciprocation of their respective pistons and carriers; to provide such a motor which does not require fossil fuels for its operation; to provide such a motor which is non-polluting; to provide such a motor which is efficient in operation, economical to manufacture, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENT

Figure 1:
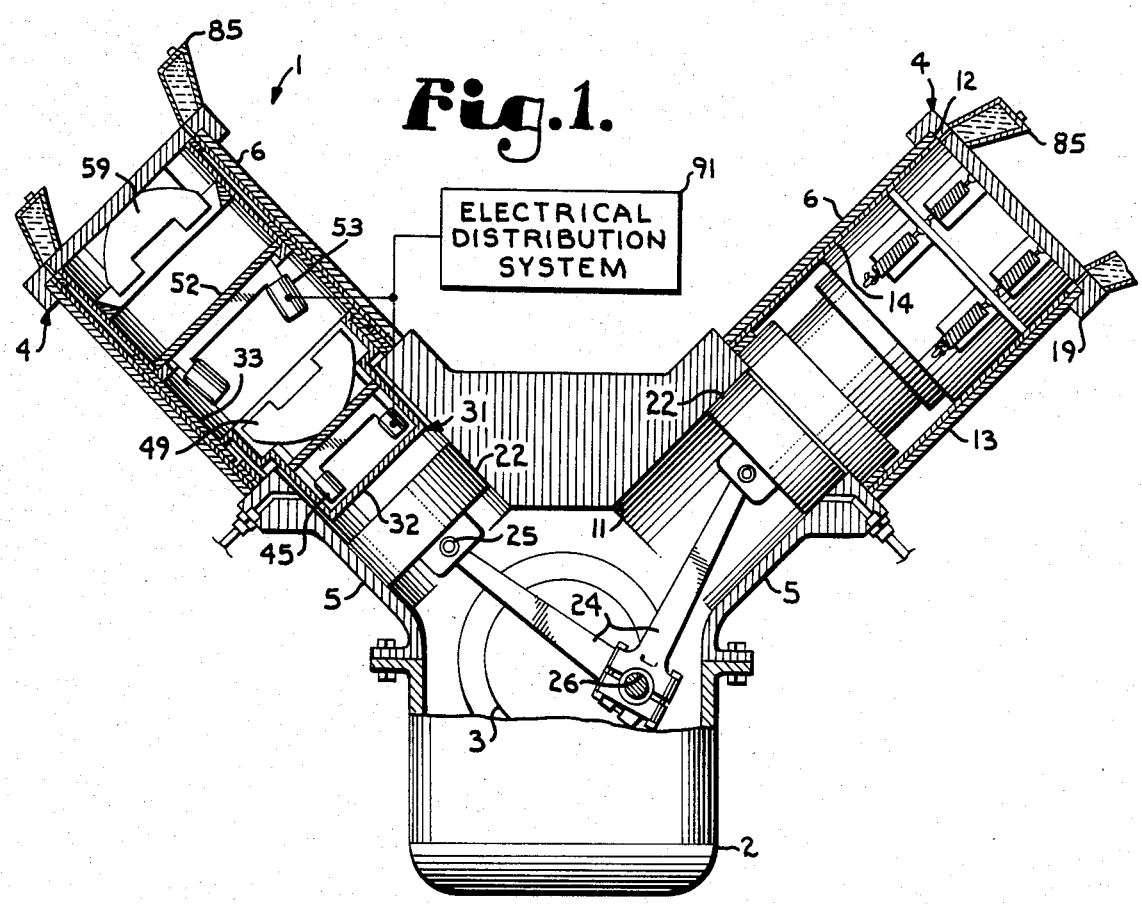
FIG. 1 is a transverse cross section of a magnetic reciprocating motor embodying the present invention.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally designates a magnetic reciprocating motor embodying the present invention. The motor 1 includes a block 2 with a crankshaft 3 journalled therein. A plurality of cylinders 4 are arranged in a pair of banks angularly disposed with respect to each other whereby a "V" configuration is formed when the motor 1 is viewed from the end. Internal combustion engines with cylinders in "V" configurations are well known and generally include even numbers of cylinders, for example, 6, 8 or 12. However, the magnetic reciprocating motor 1 comprising the present invention is compatible with other cylinder orientations, for example, vertically oriented and horizontally opposed.

The following description of a particular cylinder 4 is applicable to all of the cylinders of the motor 1.

The cylinder 4 comprises a non-ferrous material and includes inboard (crank) and outboard (head) portions 5,6 with respective ends 11, 12. An outer casing 13 comprises two layers and an inner casing 14 includes inboard and outboard portions 15, 16 spaced inwardly from the cylinder outer casing 13 whereby respective inboard and outboard casing spaces 17, 18 are formed. A cylinder head 19 is bolted to the cylinder outboard end 12.

A piston 22 is reciprocably disposed within the cylinder inboard portion 5 and comprises a non-ferrous material except for a U-shaped first permanent magnet 23 embedded therein. A rod 24 is connected to the piston 22 by a wrist pin 25 and to the crankshaft 3 by a bearing 26.

Figure 4:
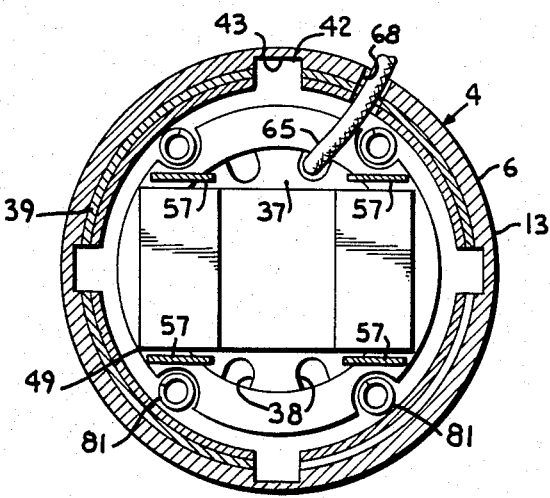
FIG. 4 is a cross section of the motor particularly showing a typical cylinder and taken generally along line 4—4 in FIG. 2.

A magnet carrier assembly 31 is provided in the cylinder outboard portion 6. The carrier assembly 31 generally comprises inboard and outboard sliding elements 32, 33. The inboard sliding element 32 terminates at a closed, inboard end 34 and includes a circumferential shoulder 35 and a circumferential flange 36. A plate 37 extends transversely across the inboard sliding element 32 approximately midway along its length. The plate 37 includes four orifices 38 positioned as shown in FIG. 4. A guide sleeve 39 is fixedly attached to the sliding element flange 36 and includes inboard and outboard ends 40, 41 received within inboard and outboard casing spaces 17, 18 respectively. A first electromagnet 45 is mounted on the inboard face of the plate 37 and includes a pair of windings 46 extending in an inboard direction. A second permanent magnet 49 is mounted on the outboard face of the plate 37.

The outboard sliding element 32 comprises a sliding plate 52 with a second electromagnet 53 having windings 54 and four non-ferrous barriers 57 located on each side of each winding 54. A third permanent magnet 59 is mounted on the inboard face of the cylinder head 19. Four non-ferrous barriers 62 extend from the inboard face of the cylinder head 19 adjacent each side of each pole of the third permanent magnet 59.

Pressure lines 65 are criss-crossed between associated pairs of cylinders 4. Each pressure line 65 includes an inboard end 66 communicating with the inboard portion 5 of a respective cylinder 4 and an outboard end 67 communicating with the interior of the carrier assembly inboard sliding element 32 of an associated cylinder 4. As shown in FIG. 1, the pressure lines 65 between associated pairs of cylinders 4 criss-cross between respective cylinder inboard and outboard portions 5, 6. The pressure line outboard end 67 extends through the outer casing 13 and through an elongated slot 68 in the guide sleeve 39, through an orifice 38 in the plate 37 and terminates in proximity to the inboard sliding element inboard end 34. An electrical line 70 enters the carrier assembly 31 in the same manner as the pressure line 65 and branches to the first and second electromagnet windings 46, 54.

A circumferential inboard stop member 73 is provided at the juncture of the cylinder inboard and outboard portions 5, 6 and has a plurality of helical springs 74 mounted thereon for engaging the shoulder 35 of the carrier assembly inboard sliding element 32. An intermediate stop member 76 is formed at the inboard end of the outboard inner casing 16 and includes a plurality of helical springs 74 for engaging the inboard sliding element flange 36. An outboard stop member 78 extends circumferentially around the interior of the inner casing outboard portion 16 and includes a plurality of helical springs 74 attached thereto for engaging and stopping the sliding plate 52 at its outermost position. Four helical inboard return springs 81 are attached to the inboard sliding element flange 36 and the sliding plate 52. Four helical outboard return springs 82 are attached to the sliding plate 52.

A lubrication system for the cylinder 4 comprises a pair of oil reservoirs 85 mounted on the cylinder head 19 and communicating with the outboard casing space 18. A lubricating film of oil flows through the casings 13, 14 and lubricates the guide sleeve 39 as it reciprocates within the cylinder 4. The other portions of the engine 1, including the crankshaft 3 and the piston 22 are lubricated in a conventional manner well known in the internal combustion engine art.

As shown in FIG. 4, a rib 42 extending longitudinally along the guide sleeve 39 is received in a corresponding groove 43 extending longitudinally along the outer casing 13 to prevent the carrier assembly 31 from rotating within the cylinder 4. A vent aperture 88 is provided in proximity to the outboard end 12 of the cylinder 4 and selectively communicates the cylinder outboard portion 6 with the atmosphere.

An electrical distribution system is schematically indicated at 91 and functions to energize the windings 46, 54 of the elecromagnets 45, 53 as required to run the motor 1 at a desired speed. Electrical current from a suitable source (not shown) is received by the electrical distribution system 91 and carried by the electrical lines 70 to the electromagnet windings 46, 54. The electrical distribution system 91 may include a distributor driven by, for example, a timing gear drivingly connected to the crankshaft 3. Speed control means may be provided in the form of a variable rheostat for controlling the amount of current emitted from the distribution system 91. The speed of the motor 1 varies in proportion to the electrical current input because the magnetic force fields generated by the electromagnets 45, 53 determine the power of the repulsive forces generated within each cylinder 4 which in turn influences the speed with which the pistons 22 are reciprocated.

Figure 2:
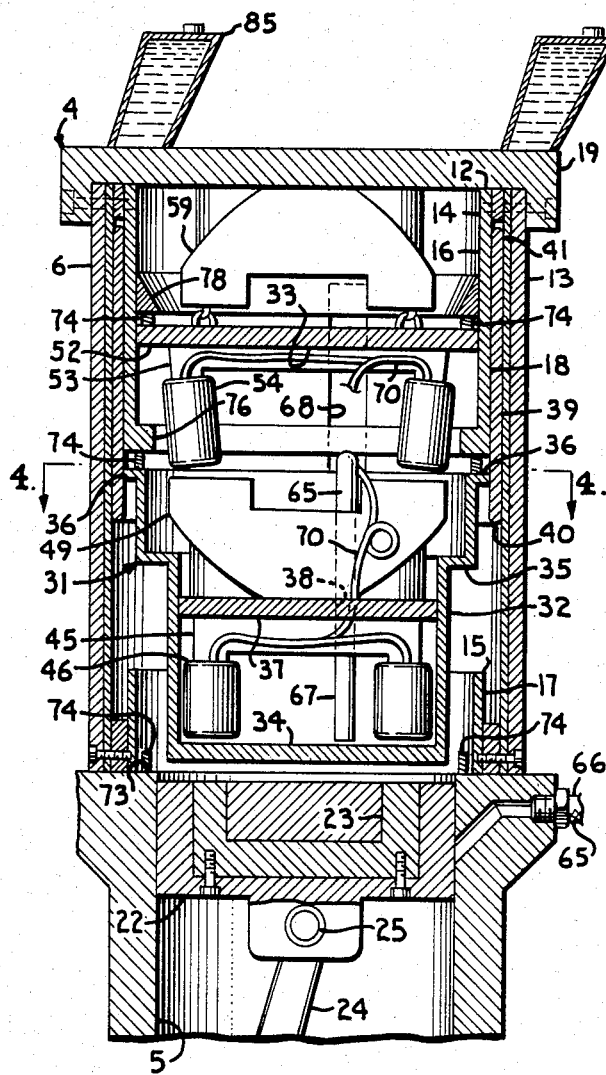
FIG. 2 is a transverse cross section of the motor particularly showing a cylinder with its piston extended and its carrier assembly retracted.

The operation of the motor 1 will be described by referring to the cycle of a cylinder 4. As shown in FIG. 2, the piston 22 and the carrier assembly 31 are in their respective top dead center positions with the piston 22 extended and the carrier assembly 31 retracted. Electrical current is passed from the electrical distribution system to the electromagnet windings 46, 54 whereby magnetic force fields are generated.

The magnetic field forces repulse the permanent magnets 23, 49, and 59 because like poles of all of the magnets 23, 45, 49, 53 and 59 are aligned. For example, all of the permanent magnet poles appearing on the left hand side of the cylinder 4 as oriented in the drawings might be negative (south) and all of their poles on the right hand side positive (north). The left and right windings 46, 54 of the electromagnets 45, 53, when energized, are respectively negative and positive. Thus, the first electromagnet 45 repulses and is repulsed by the first and second permanent magnets 23, 49. Likewise, the second electromagnet 53 when energized repulses and is repulsed by the second and third permanent magnets 49, 59. The repulsive forces are in effect relayed through the entire carrier assembly 31 from the first permanent magnet 23 in the piston 22 to the third permanent magnet 59 attached to the cylinder head 19. The net force exerted by the repulsive forces thus generated within the cylinder 4 is greatly multiplied over that which would normally be present between the first and third permanent magnets 23, 59.

When the electromagnet windings 46, 54 are energized, the outboard sliding element 33 is urged downwardly or in an inboard direction and in turn urges the inboard sliding element 32 in the same direction. The piston 22 is retracted by the combined repulsive forces of all of the magnets 23, 45, 49, 53 and 59 whereby rotary motion is imparted to the crankshaft 3. The foregoing description relates to a "power" stroke for the piston 22 and carrier assembly 31.

Figure 3:
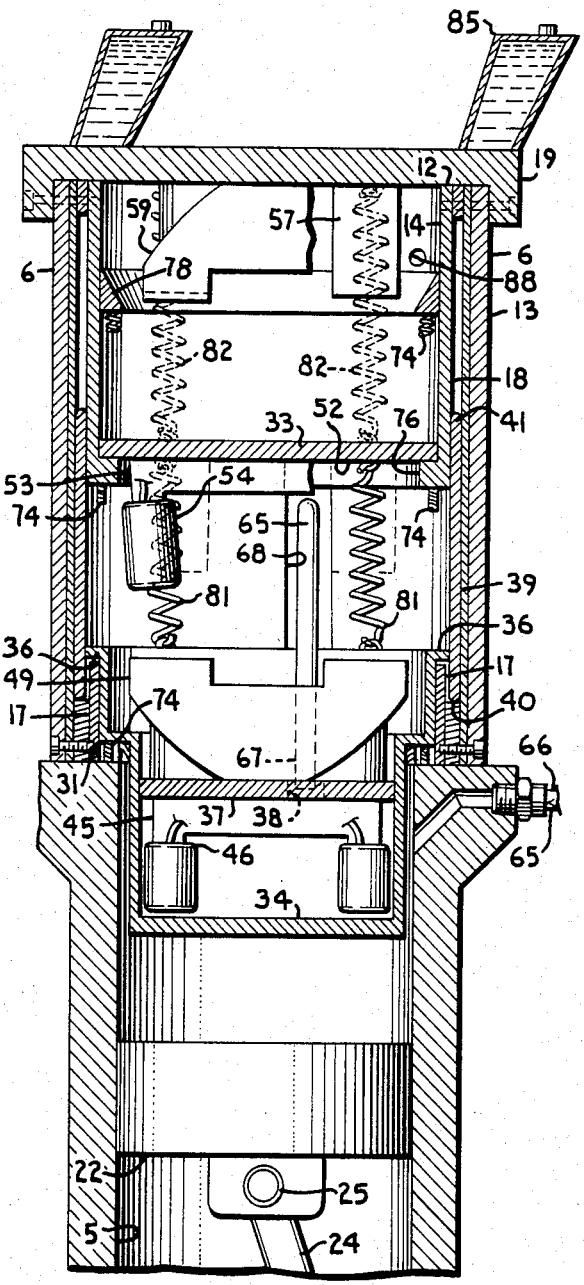
FIG. 3 is a transverse cross section of the motor particularly showing a cylinder with its piston retracted and its carrier assembly extended.

When the piston 22 is fully retracted at the end of its power stroke with the carrier assembly 31 fully extended (FIG. 3), the electrical distribution system 91 deenergizes the electromagnets 45 and 53 whereby their respective magnetic fields collapse. The piston 22 of the opposing cylinder 4 is at top dead center at this instant. The piston 22 then commences its return stroke, impelled by the power stroke of the opposing piston 22. Rotational torque force is thus imparted to the crankshaft 3 which has a flywheel (not shown) mounted thereon to dampen the kinetic forces associated with the reciprocation of the pistons 22 and the carrier assemblies 31.

The carrier assembly 31 is retracted by the return springs 81 and 82 and by magnetic attraction between the permanent magnets 23, 49, 59 and the deenergized electromagnet windings 46, 54. Also, compression of air within the cylinder inboard portion 5 by the piston 22 and within the carrier assembly 31 by the inboard sliding element 32 facilitates retraction of the carrier assembly 31. Part of the excess air compressed on the return stroke is bled off through the pressure lines 65 to the opposing cylinder 4 where it is applied to assist the power stroke occurring simultaneously therein. The communication of air between the cylinders 4 by the pressure lines 65 also cools the motor 1 by eliminating excessive pressure build-ups and by creating a draft between the cylinders 4. The outermost portion of the cylinder 4 is vented to the atmosphere by the vent aperture 88. Also, the magnetic permeability of the magnets is improved by lowering the operating temperature of the motor 1.

The fields emitted by the magnets 23, 45, 49, 54 and 59 are concentrated and thus greatly increased in strength by the non-ferrous cylinder 4 and the carrier assembly 31 surrounding them and by the barriers 57.

It is to be understood that while certain forms of the present invention have been illustrated and described herein, it is not to be limited to the specific forms or arrangement of parts described and shown.

What is claimed and desired to be secured by Letters Patent is as follows:

1. A magnetic reciprocating motor, which comprises:
   (a) a block;
   (b) a crankshaft journalled in said block;
   (c) a cylinder mounted on said block and including inboard and outboard portions;
   (d) a cylinder head mounted on said cylinder outboard portion;
   (e) a piston slidably disposed in said cylinder inboard portion and including a piston magnet;
   (f) a carrier assembly slidably disposed in said cylinder outboard portion and including inboard and outboard sliding elements slidably reciprocable with respect to each other;
   (g) a first permanent magnet on said piston;
   (h) a first electromagnet mounted on said carrier assembly inboard sliding element;
   (i) a second permanent magnet mounted on said carrier assembly inboard sliding element;
   (j) a second electromagnet mounted on said carrier assembly outboard sliding element;
   (k) a third permanent magnet mounted on said head; and
   (l) means for energizing said electromagnets whereby said magnets repulse each other and said piston and said carrier assembly are reciprocated within said cylinder.

2. The motor according to claim 1, which includes:
   (a) said cylinder outboard portion comprising inner and outer casings forming a casing space therebetween; and
   (b) said cylinder inboard sliding element having a guide sleeve slidably disposed in said cylinder casing space.

3. The motor according to claim 1, which includes:
   (a) said inboard sliding element having a plate with said first electromagnet and said second permanent magnet mounted thereon.

4. The motor according to claim 3, which includes:
   (a) an orifice through said inboard sliding element plate;
   (b) a slot in said cylinder outboard portion; and
   (c) a pressure line extending through said slot and said orifice and terminating within said carrier assembly inboard sliding element for communicating pressurized air therewith.

5. The motor according to claim 4, which includes:
   (a) said pressure line comprising a first pressure line; and
   (b) a second pressure line communicating pressurized air with said cylinder inboard portion.

6. The motor according to claim 1, which includes:
   (a) said outboard sliding element comprising a plate slidably disposed within said inboard sliding element.

7. The motor according to claim 1, which includes:
   (a) a plurality of inboard return springs interconnecting said inboard and outboard sliding elements; and
   (b) a plurality of outboard return springs interconnecting said outboard sliding element and said cylinder head.

8. The motor according to claim 1, which includes:
   (a) one of said cylinder and said carrier assembly having a longitudinal groove extending in the direction of carrier assembly travel; and
   (b) the other of said cylinder and said carrier assembly having a rib slidably received in said groove.

9. A magnetic reciprocating motor, which comprises:
   (a) a block;
   (b) a crankshaft journalled in said block;
   (c) a plurality of cylinders connected to said block, each said cylinder including:
      (1) an inboard portion terminating at an inboard end;
      (2) an outboard portion terminating at an outboard end, said outboard portion including inner and outer casings forming a casing space therebetween;
   (d) a plurality of cylinder heads each attached to a respective cylinder outboard end;
   (e) a plurality of pistons each slidably disposed in a respective cylinder inboard portion and operably connected to said crankshaft;

(f) a plurality of carrier assemblies each slidably disposed in a respective cylinder outboard portion and including:
  (1) an inboard sliding element having a guide sleeve slidably disposed in said cylinder casing space and a plate with an orifice therethrough; and
  (2) an outboard sliding element including a plate slidably disposed in said inboard sliding element;
(g) a plurality of first permanent magnets each mounted on a respective piston;
(h) a plurality of first electromagnets each mounted on a respective inboard sliding element plate;
(i) a plurality of second permanent magnets each mounted on a respective inboard sliding element plate;
(j) a plurality of second electromagnets each mounted on a respective outboard sliding element plate;
(k) a plurality of third permanent magnets each mounted on a respective cylinder head;
(l) a pair of pressure lines connecting each cylinder with a respective cylinder opposed thereto, each said pressure line having an inboard end communicating with the inboard portion of one of said cylinders and an outboard end communicating with the outboard portion of the other of said cylinders, said pressure line outboard ends extending through respective inboard plate orifices;
(m) a plurality of inboard return springs each interconnecting respective inboard and outboard sliding elements;
(n) a plurality of return springs each interconnecting an outboard sliding element and a respective cylinder head;
(o) an electrical distribution system adapted for selectively energizing said electromagnets;
(p) a plurality of electrical wires each extending from said electrical distribution system to a respective electromagnet; and
(q) a plurality of slots each extending through a cylinder and a respective inboard sliding element and receiving a respective electrical wire and a respective pressure line outboard end.

10. The motor according to claim 9 which includes:
(a) each said cylinder head having an oil reservoir mounted thereon and communicating with a respective casing space.

11. The motor according to claim 9 which includes:
(a) a plurality of longitudinal grooves each extending longitudinally along one of a respective cylinder and carrier assembly inboard sliding element in the direction of sliding element travel; and
(b) the other of each said respective cylinder and carrier assembly inboard sliding element having a rib slidably received in said groove.

* * * * *